(12) United States Patent
Micarelli

(10) Patent No.: US 8,714,961 B2
(45) Date of Patent: *May 6, 2014

(54) PRESS SYSTEM FOR FORMING A COMPOSITE ARTICLE

(71) Applicant: Jamin Micarelli, Woodinville, WA (US)

(72) Inventor: Jamin Micarelli, Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,762

(22) Filed: Feb. 4, 2013

(65) Prior Publication Data

US 2013/0149402 A1    Jun. 13, 2013

Related U.S. Application Data

(62) Division of application No. 13/049,765, filed on Mar. 16, 2011, now Pat. No. 8,366,984, which is a division of application No. 12/401,582, filed on Mar. 10, 2009, now Pat. No. 7,910,039.

(60) Provisional application No. 61/068,964, filed on Mar. 10, 2008.

(51) Int. Cl.
*B28B 21/36* (2006.01)

(52) U.S. Cl.
USPC ........ 425/405.2; 425/383; 425/389; 425/469; 264/314

(58) Field of Classification Search
USPC ............... 425/405.2, 383.1, 389, 394, 469
See application file for complete search history.

(56) References Cited

U.S. PATENT DOCUMENTS 7,862,323 B2 *   1/2011   Micarelli .................. 425/405.2

* cited by examiner

*Primary Examiner* — Yogendra Gupta
*Assistant Examiner* — Robert J Grun
(74) *Attorney, Agent, or Firm* — Patrick M Dwyer

(57) ABSTRACT

A press with a pressure chamber and a lid. The chamber is filled with a substantially incompressible medium and the medium at least partially encloses an elastomeric pressure vessel. The vessel is filled with a substantially incompressible fluid that is in fluid communication with a pressurized source of the fluid.

8 Claims, 6 Drawing Sheets

PRESS SYSTEM FOR FORMING A COMPOSITE ARTICLE

This application is a division of U.S. patent application Ser. No. 13/049,765 filed Mar. 16, 2011 to be issued on Feb. 5, 2013 as U.S. Pat. No. 8,366,984 which was a division of U.S. patent application Ser. No. 12/401,582 filed Mar. 10, 2009, now issued as U.S. Pat. No. 7,910,039 on Mar. 22, 2011 and which claimed priority to U.S. Provisional Application 61/068,964 filed Mar. 10, 2008.

TECHNICAL FIELD

The invention relates to the field of presses and molding; particularly, it relates to method and apparatus for forming a high strength composite article; more particularly, it relates to a rapidly cycling pressure chamber filled with a pressure transfer medium such as silicone that encloses a high pressure elastomeric vessel.

BACKGROUND OF THE INVENTION

In a conventional hydraulic press there is a steel piston chamber that contains oil and as oil is pumped into the piston chamber, the piston is pushed out of the piston chamber into pressurized contact with a work piece. In an alternate, or hydro-forming press, high-pressure water is forced into a closed chamber against a metal sheet or tube and, as the pressure builds in the chamber, the sheet is pressed and stretched into a cavity behind it. Another press positions a work piece between a conventional movable forming die and an expandable bladder optionally filled with fluid under pressure. Still another press uses an enclosed inflatable container in communication with hydraulic fluid reservoirs to provide the pressure for the ram in the hydraulic press so the hydraulic fluid is never in direct contact with any of the structural mechanisms of the press.

In conventional press designs, the chamber is closed with a rubber gasket or a low pressure seal, or as is the case with a hot isostatic press (HIP) a simple screw type plug lock. In a conventional HIP press, the pressure transfer medium is a hot gas such as nitrogen or argon, or water, or oil or a rubber crumb, and heating and cooling is achieved by thermal transfer to the work piece through the gas or other transfer medium, or a by a heated mold.

In forming advanced composite articles under high pressures and temperatures, it is recognized that certain silicone compounds are useful as uniform pressure transmitting media, and U.S. Pat. No. 4,770,835 to Kromrey is incorporated herein by reference as if fully set forth in order to provide further background about such compounds.

Conventional high strength, low weight structural composites are made from materials such as fiberglass or graphite. The composite article is typically made of multiple layers of so-called pre-pregs (combination resin and fiber materials) which have been laid up over a mold or die and thereafter cured under selected temperature and pressure conditions. Curing of the pre-preg layup is conventionally accomplished in an autoclave and requires the use of a vacuum bag or other type of barrier to prevent the pressurized fluid or gas from penetrating the layers and ruining the composite article which is being fabricated. But autoclaves are expensive and limited in pressure range and vacuum bags have a tendency to leak, resulting in a comparatively high reject rate.

One proposed solution has been to utilize so-called trapped rubber molding systems to cure such components. This is generally a closed container or mold within which is placed a cured elastomer such as a silicone rubber that has a high coefficient of thermal expansion. Heating the part in the mold in the container causes the surrounding elastomer to expand and, when the apparatus is properly configured, the elastomer then applies a uniform isostatic pressure to the pre-preg layup in the mold or on the die.

Another proposed solution is to encapsulate or pre-cast a work piece inside a crushable ceramic, and then apply pressure to the ceramic to simultaneously crush it and expose the work piece to consolidation pressure.

What does not yet appear is any means or method of providing a primary pressure source to a pressure transfer medium in a press that does not involve some kind of conventional ram (hydraulic, mechanical or otherwise) or thermal expansion aspect. What is needed is a press filled with a substantially incompressible medium such as silicone, where the medium at least partially encloses an elastomeric vessel filled with fluid such as oil or water and in fluid communication with a source of pressurized fluid, such that, as the vessel is pressurized inside the transfer medium, the pressure expands throughout the medium to provide a substantially uniform pressure to the work piece against the mold. What is also needed is a rapid cycling, high pressure press, that can be rapidly and readily opened to remove and replace a consolidated composite article with a new pre-preg layup, and then rapidly and effectively closed and sealed again for the next part cycle. What is needed is a high pressure low cost system capable of high production volumes and rapid part cycle times.

DISCLOSURE OF THE INVENTION

A press is disclosed herein that is filled with a pressure transfer medium such as a substantially incompressible medium such as silicone, where the medium at least partially encloses an elastomeric vessel that is filled with a substantially incompressible fluid such as oil or water that is in fluid communication with a pressurized source of the same fluid. Also disclosed is a short cycle heating and cooling apparatus and method for the mold and work piece, in a pressure chamber or vessel that is adapted to be readily and rapidly closed and locked to facilitate rapid part cycling into and out of the press. Suitable silicones, in addition to those disclosed by Kromrey, are platinum cure thermal setting silicones.

Active pressure and locking are types of lids or press closures that are advantageous for rapidly opening and closing a press and rapid part replacement in the press. Such closures may be lids or may be other closure systems. For instance in one active pressure closure, a lid closure is held closed under active hydraulic pressure; in another active pressure closure system, a lid of a press enclosure is first closed and locked on the enclosure, hydraulically or otherwise, and then an open pressure chamber inside the enclosure is hydraulically raised or lifted to seal a lip or sealing surface of the open chamber against a mating sealing surface of the enclosure lid, and then actively hydraulically held in that mating and sealed relationship until the composite article is completed, whereupon the chamber pressure is reduced, the chamber is lowered releasing the seal, and the enclosure door is opened to remove and replace the article.

In one locking chamber design the lid is closed via cams, levers and locking pins (optionally hydraulically assisted or activated). In another locking chamber design, the lid is closed with locking threads, such as artillery breach screw threads. Breech screws have interrupted threads which allow the screw to be locked or unlocked by a partial turn of the screw. Their strength depends on their length, diameter, and the percentage of the surface carrying screw threads, so the greater the percentage bearing surface the shorter the breech screw needs to be and the easier it is to open. Some breech screws have interrupted threads. Locking lids may advantageously be gates or doors, sliding or hinged, or artillery style breach threading.

In a disclosed press, instead of a steel hydraulic piston chamber with a movable steel piston, there is pressure chamber (that may optionally be lined with a rubber bladder). Inside this pressure chamber there is an elastomeric pressure vessel suspended in an substantially incompressible pressure transfer medium, such as solid silicone, or particulate silicone (beads), or a combination of the two. Sometimes this vessel is referred to herein as an expandable bladder. The vessel is advantageously made from a grade of rubber that is highly elastic, durable over 1000 s of expansion cycles and impervious to the fluid selected for filling the vessel at operating pressures and temperatures.

The expandable bladder or vessel is in fluid communication with a source of high pressure fluid, such as oil or water. This elastomeric pressure vessel is adapted to expand in two ways, and at two stages. In a first stage at relatively low pressures, as the transfer medium itself is compressed and coalesced, and as any negative mold or work space is taken up and filled with the flowable and compressed transfer medium, the vessel or bladder itself literally expands to fill the available space, and concurrently, the vessel receives more fluid to effect this expansion, enabled in this expansion by the elastomeric nature of the vessel. In a second stage at operating consolidation pressures (advantageously about 3000 to 10000 psi, or about 21 to 69 MPa), the vessel or bladder no longer literally expands to any significant extant (generally only such as necessary to accommodate and account for the slight further compression of the pressure transfer medium at operational pressures), but its elastomeric nature causes any pressure increase inside the vessel that is generated by increased pressure from the source of high pressure fluid (such as a hydraulic pump) to be transmitted across the elastomeric barrier and into the transfer medium, in a way that would not be possible if the vessel were rigid.

"Suspended in the transfer medium" means that the pressure vessel or bladder is generally and advantageously enclosed by the transfer medium material. This suspension or enclosure may optionally and selectably be set up to vary from partial enclosure to complete enclosure. It is generally advantageous to have the pressure vessel inside, or at least partially inside, the transfer medium matrix, and not outside.

"Substantially incompressible" means that at operating consolidation pressures, there is less than about 2% further compression of the transfer medium after initial voids and/or other spaces in the flowable transfer medium material are coalesced into what is sometimes referred to as a continuous void-free body.

As the suspended and expandable bladder is filled with high pressure fluid, it in turn pressurizes the transfer medium which, once all the unoccupied space (sometimes referred to herein as negative space) in the chamber is compressed, in turn uniformly transfers pressure to the formable part or work piece that has been positioned between the mold in the chamber and the transfer medium for consolidation. "Uniform transfer" means that the pressure exerted by the pressurized fluid in the elastomeric pressure vessel is substantially uniformly applied in a hydraulic-like manner throughout the transfer medium, and to all surfaces with which the transfer medium is in contact, including the chamber walls and the work piece.

Optionally, the mold and work piece may be outside the silicone transfer medium matrix, and still in a pressure-mating relationship to the matrix, such that uniform pressure is applied by the matrix to every point on the work piece against the mold. Alternatively, the mold and work piece may be enclosed within the matrix, where uniform pressure is applied to all sides of the work piece against the mold and also the faces of the mold that are away from the work piece. Advantageously, in this instance, the mold and work piece may be enclosed within a bag that is ventable to release any trapped air, or otherwise separated from the pressure transfer medium by a barrier. As the preferred pressure transfer medium is generally not reactive with the composite materials, the barrier or bag may be either permeable or non-permeable.

The pressure transfer medium (or transfer material) can be made from a number of substantially incompressible elastomers or elastomeric substances. See Kromrey. One method disclosed is to fill the pressure chamber with high strength, high elongation silicone with the expandable oil bladder encased inside the block of silicone. Another method is to cast a relatively thick skinned, shaped bag (sometimes referred to as a 'rubber piston') about 0.5 inches to 2 inches (about 1.2 to 5 cm) thick, and fill it with particulate silicone solid (particles, beads, crumb-balls or spheres), that can either be uniform or vary in size, and to suspend the expandable bladder or vessel inside the particulate silicon inside the rubber piston. A surface lubricating agent may optionally be added to lubricate interaction of the beads with each other and with the inside of the rubber piston, or self-complying, coalescing particulates such as disclosed by Kromrey may be employed. Yet another method is to employ particulate silicone as above and omit the bag, and use a retaining barrier to retain the particulates inside the press when the press is open as the particulates would otherwise be subject to spilling out.

As the inner bladder (pressure vessel) expands, the silicone is quickly pushed into any and all available free spaces, and then as the pressure from the expanding suspended bladder increases, the silicone is evenly distributed throughout the pressure chamber, or the rubber piston within the pressure chamber, and the pressure from the expanding bladder is transferred through the beads to the rubber piston surfaces (or to the chamber walls and the retaining barrier surfaces) uniformly.

A combination of solid and particulate silicones may also be used as a pressure transfer medium. In particular, an elastomeric bag of particulate silicone is optionally disposed between a solid silicone matrix and the mold and workpiece. Or in a press aligned or alignable with gravity (such as an 'upright' press), such that opening its lid leaves particulates inside the press rather than spilling out, a layer of particulates without either a bag or retaining barrier may be disposed over and above the solid matrix of silicone. Optionally in this 'upright' or gravity-held arrangement, the entire pressure chamber can be filled with particulates without a bag or retaining barrier.

In one version of a disclosed press, pressure to a work piece is created by the substantially uniform transfer to the work piece on the mold of hydraulic or hydraulic-like energy, sometimes referred to herein as an indirect transfer. Inside a pressure chamber there is a mold/platen combination (that can advantageously be either a male or female mold, or a combination of the two, and wherein the platen may be optionally built-in to the mold) that optionally includes a hot/cold mold or platen substrate which is either fluid or electrically heated and then fluid cooled.

For opening and closing the press, a lid-based design is advantageous for the pressure chamber, rather than the conventional guided platen design. This generally lowers the overall size and weight of the press by a large margin. The lid closes and is preferably locked in place by locking rods or clamps, or by artillery breach screw, or the like, or held in place by optional active hydraulic closure. Another advantage of the lid based design is that the required overall movement or stroke of the press can be much lower than a conventional press that needs to clear both consolidation space and working room. This reduces the amount of steel needed to build the press and lowers the size requirement of the press dramatically.

The disclosed press desirably takes on the form of a sealable pressure chamber capable of maintaining extremely high levels of mechanical pressure. A top- or side-closing lid that is locked or held in place provides rapid access to the chamber. The hot and cold platen and the mold may be in the chamber, or disposed upon the lid. In the remaining space of the chamber, between the transfer medium and the mold, a space is also provided for the materials or work piece that are to be consolidated.

The mold may be milled or cast out of a metallic material such as aluminum or steel or it may be cast out of a plastic material such as urethanes, or urethanes filled with a filler substance such as aluminum beads to increase compression strength and thermal conductivity from the hot platen to the part surface.

In operation of the disclosed press, the pressure chamber is closed and sealed and liquid is pumped under selectable and predeterminable pressure into the elastomeric vessel that is suspended in the silicone transfer medium. The amount of pressure that can be used is limited only by the capacity of the pump in the high pressure source, and by the strength of the chamber itself. The bladder is desirably sized such that the volume to which it is capable of expanding is greater than the volume of any open or remaining space in the chamber before operating pressures are applied.

In disclosed press designs, the guides and alignment equipment usually necessary on a conventional high pressure press are not necessary. This is believed to be due to the self-leveling of the liquid transfer of pressure, thus also reducing cost and labor required to assemble the press.

The pressure chamber can be of any shape or size, and made of any material or set of materials that can contain the necessary pressure. Optionally, in the case of a purpose built press, the female platen and the outer chamber may be the same thing. A block of steel or aluminum can have the reverse form milled out of it and a lid mounted on it. The bladder is inserted and the negative space filed with silicone. In this case the press would be a block of material with a lid mounted on it, again, reducing the overall cost dramatically.

A lid for closing and sealing the pressure chamber or press housing is optionally hydraulic in operation. In a conventional hydraulic press, a piston rod moves up or down to allow "daylight" between the press platens so that a part can be removed or new materials put in place. In this disclosure, the one of the press platens, such as the top platen, is the lid of a box design that is able to lock and unlock to accommodate opening or closing. Rather than having a stroke of 15 inches as in a conventional press, a press can have a stroke as short as 3 inches and still accommodate the same materials and effectively press and consolidate them. In the conventional press, the extra 12 inches of piston stroke are only there to have the platen open far enough to allow the user access to the press platen surface or the mold held within it. The lid is optionally held in place by hydraulically actuated locking pins, or by locking cams.

In the press it is advantageous to employ compressible gaskets to seal in silicone under high pressure. These gaskets may be conventional, or they are desirably a novel silicone filled, wedging arrangement as disclosed herein. In general, disclosed wedging gaskets have one (typically an outer, but could optionally be inner) relatively rigid member with a surface that is in mating press fit relationship to the vessel or lid to be sealed, and another slightly angled inner (or outer) slightly resilient member appropriately shaped to mate with the respective other part of the vessel or lid to be sealed, generally in something less than an interference fit. The requisite slight resilience of the angled member is achieved with selection and dimensioning of the material of the angled member, as will be appreciated by those skilled in the art, so that the angled member can be deformed and then spring back to its original dimension and configuration.

A space or void between the gasket outer member and the angled inner member is advantageously filled with silicone or other substantially incompressible but elastomeric medium. In operation then, as the lid is closed or the pressure chamber is otherwise closed, the angled inner member of the gasket is aligned and preliminarily mated with its respective sealing surface. This preliminary mating is not a fully sealed relationship however, and any gases under pressure in the vessel are vented or ventable through this gasket as the pressure in the vessel increases. Then after initial compressing pressure is applied inside the chamber and trapped or entrained gases such as air are vented out through the gasket's not yet perfect seal, the transfer medium is pressed against the silicone inside the gasket, and the silicone inside the gasket in turn slightly deforms the angled member into an increasingly perfect interference fit with the respective mating surface.

Once this phase of increasing pressure has 'set' the gasket, the pressure is further increased to operational range, with each increment of pressure serving to further pressurize and hold the angled member against its sealing surface via the pressure transfer laterally through the silicone in the gasket to the angled member. Such gaskets desirably have a corner-free, or rounded, or U-shaped cross-section at the junction of the outer (or inner) member and the angled member. When the pressure in the chamber is reduced, and the corresponding pressure holding the angled member against its respective sealing or mating surface is released, the angled member springs back to its un-pressured configuration and dimension (permitted by the silicone's resilience), and the gasket ceases to be an interference fit, and the chamber lid or door is thus readily opened.

Also disclosed is a rapidly heating and cooling dual-purpose platen. The dual design includes a hot platen member (defined as a platen that has a heating system integrated, either fluid or electrical) and a cold platen member. The two platen members are assembled together with the cold platen member in contacting and thermal energy transferring relationship to the mold and work piece and to the hot platen member. The cold platen can be of varying shapes and sizes, and is generally a thinner platen with cooling channels or conduits in it that can be filled with either liquids or gases. In operation, the hot platen is advantageously maintained at consolidation press temperature, and only the cool plate is cooled as needed to cool and set the part after consolidation. The cool plate is relatively thin (for example, a hot plate 3 inches thick, with the cool plate only 1 inch thick) and made of a thermally conductive material, to aid in quickly cooling the platen and the part. When the cooling fluid is stopped, the hot platen member immediately begins heating the cool platen again. Thus during any heating cycle, the heaters only have to heat the top 1 inch or ¼ of the material of the combined platens.

Thus the heating time is about ¼ or less of the time it would conventionally take to heat a full size (example 4 inch) platen, saving both cycle time and energy.

One heating/cooling platen combination is optionally in the shape of a part mold. The heating and cooling platen members can be in various geometric configurations, such as the heating plate in an inner circle and the cooling plate in an outer circle.

A method of forming a composite article from a work piece at elevated temperatures and pressures is also disclosed. In the disclosed method, the work piece is in contact with a mold and is disposed within a pressure chamber, and a substantially incompressible medium is disposed in the chamber so that the medium is capable of transferring a substantially uniform, predetermined medium pressure to the surface of the work piece. Within the substantially incompressible medium a fluid-filled elastomeric vessel in fluid communication with a source of high pressure fluid is disposed so that the vessel is capable of causing a substantially uniform, predetermined pressure to the substantially incompressible medium as pressure is elevated inside the vessel. The vessel is then caused to produce a pressure in the range of 400 to 20000 psi and desirably in the range of 6000 to 10000 psi (about 2.8 to 138 MPa or about 42 to 69 MPa, respectively) to be applied to the substantially incompressible medium so that it in turn applies a substantially uniform predetermined medium pressure to the surface of the work piece. The mold and work piece are then exposed to temperatures well known to those skilled in the art that are appropriate to effect consolidation of the work piece materials and create the composite article, and then lowering the temperature to levels that are also well known as effective for setting particular compositions of composite article.

An alternate method rearranges and varies the steps above to disposing a substantially incompressible medium in the chamber so that the medium is capable of transferring a substantially uniform, predetermined medium pressure to the surface of the work piece and disposing within the substantially incompressible medium an oil-filled elastomeric vessel in fluid communication with a source of high pressure oil so that the vessel is capable of causing a substantially uniform, predetermined pressure to the substantially incompressible medium, and then disposing upon a lid to the pressure chamber the work piece in contact with a mold, and pressure sealing the lid to close the chamber.

A press system for forming a composite article from a work piece at elevated temperatures and pressures is also disclosed. The system has a pressure chamber filled with a substantially incompressible medium, and the medium at least partially encloses an elastomeric vessel that is filled with a substantially incompressible fluid such as oil or water and is in fluid communication with a source of pressurized fluid. The work piece is disposed within the pressure chamber, and the substantially incompressible medium is disposed in the chamber so that it is capable of transferring a substantially uniform, predetermined medium pressure to the surface of the work piece in the following steps. The vessel is filled and pressurized to produce a pressure in the range of 400 to 20000 psi (2.8 to 138 MPa) that is thus applied to the substantially incompressible medium so that the pressure transfer medium applies a substantially uniform predetermined medium pressure to the surface of the work piece; the mold and work piece are exposed to temperatures appropriate to cause consolidation of the work piece layers, as is well known in the art, and depending on the number and composition of the layers, in a well known fashion; and reducing the mold and work piece temperature to set the composite article.

BEST MODE OF CARRYING OUT THE INVENTION

Figure 1:
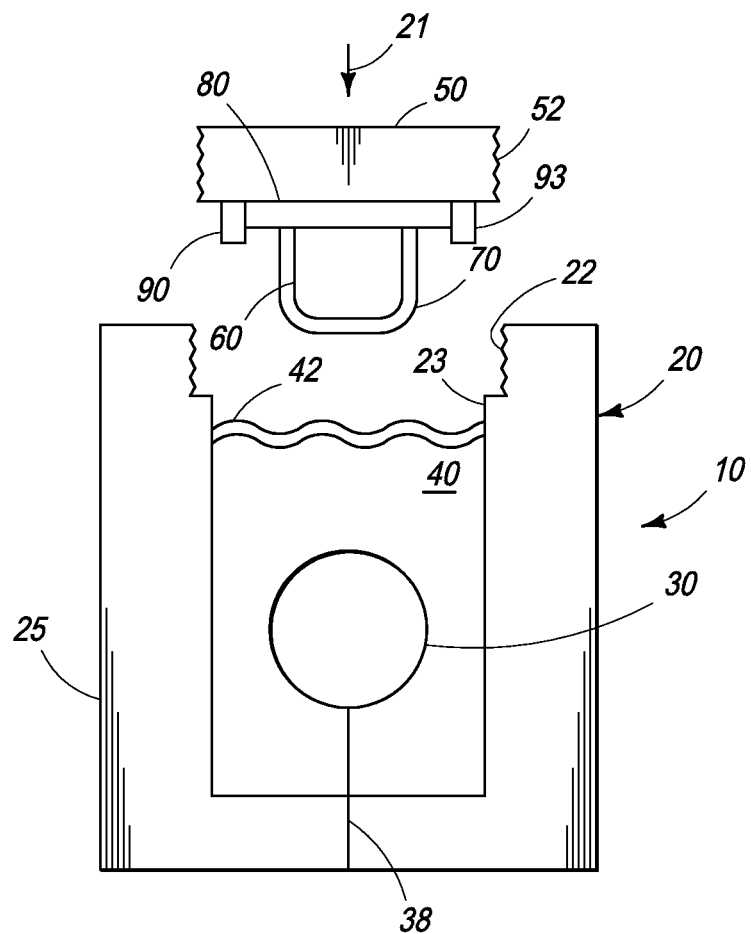
FIG. 1 is a schematic illustration of an embodiment of the disclosed press.

Turning now to the drawings, the disclosed press and method are described in illustrative embodiments by reference to the numerals of the drawing figures wherein like numbers indicate like parts.

FIGS. 1 and 4 schematically illustrate an example of the disclosed press. The arrows inside vessel 30 schematically and graphically illustrate increasing pressure as the fluid 35 is pumped into vessel 30 via conduit 38 from a high pressure source of the fluid (not shown). The increasing number of such arrows from FIG. 4*a* in sequence to FIG. 4*d* is a kind of graphic schematic scale to illustrate that as fluid is pumped into vessel 30, and the fluid pressure goes up, the work piece or formable part 70 is subject to greater and greater pressure through the pressure transfer medium 40.

Figure 2:
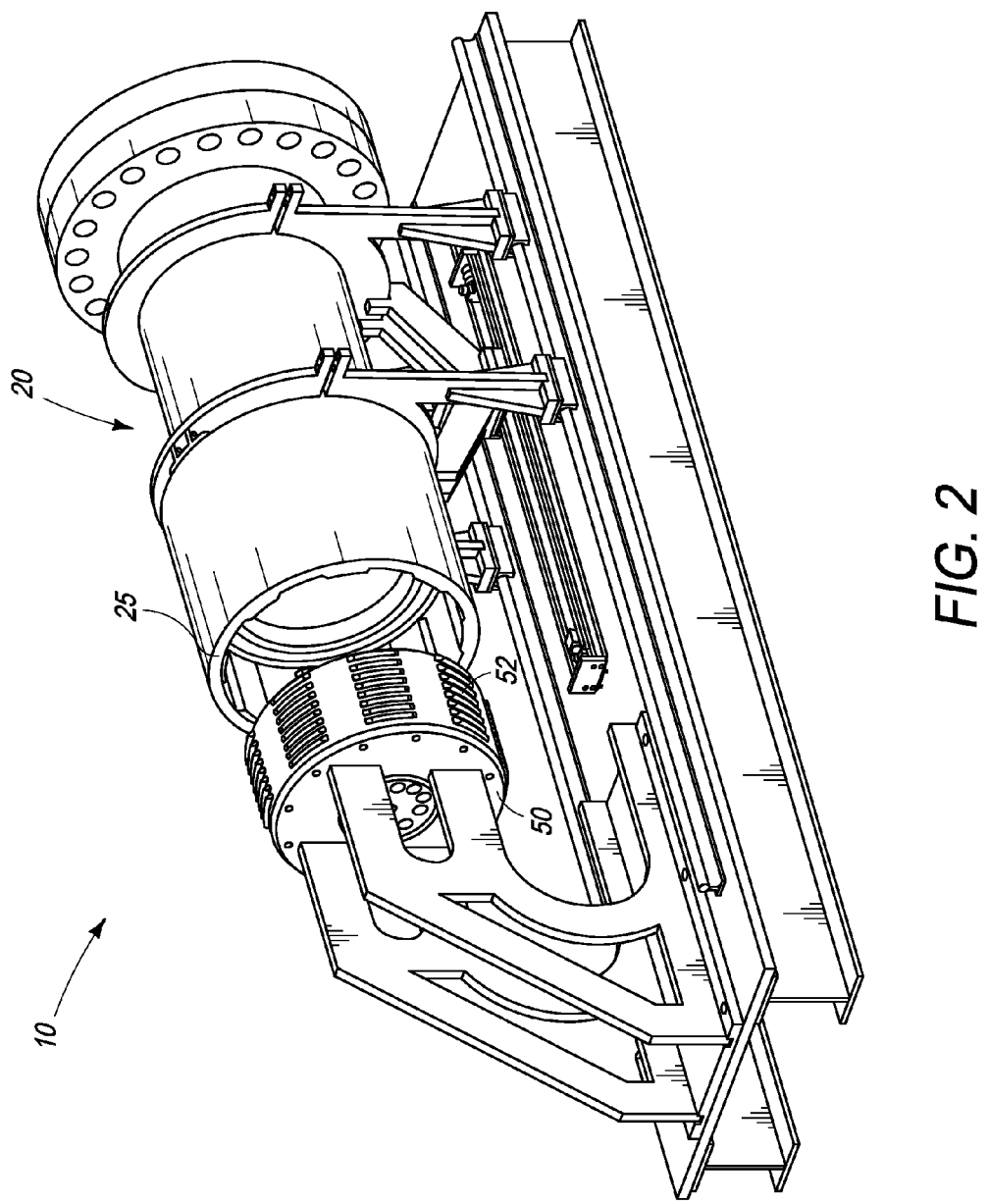
FIG. 2 is a perspective view of an embodiment of the disclosed press.
Figure 3:
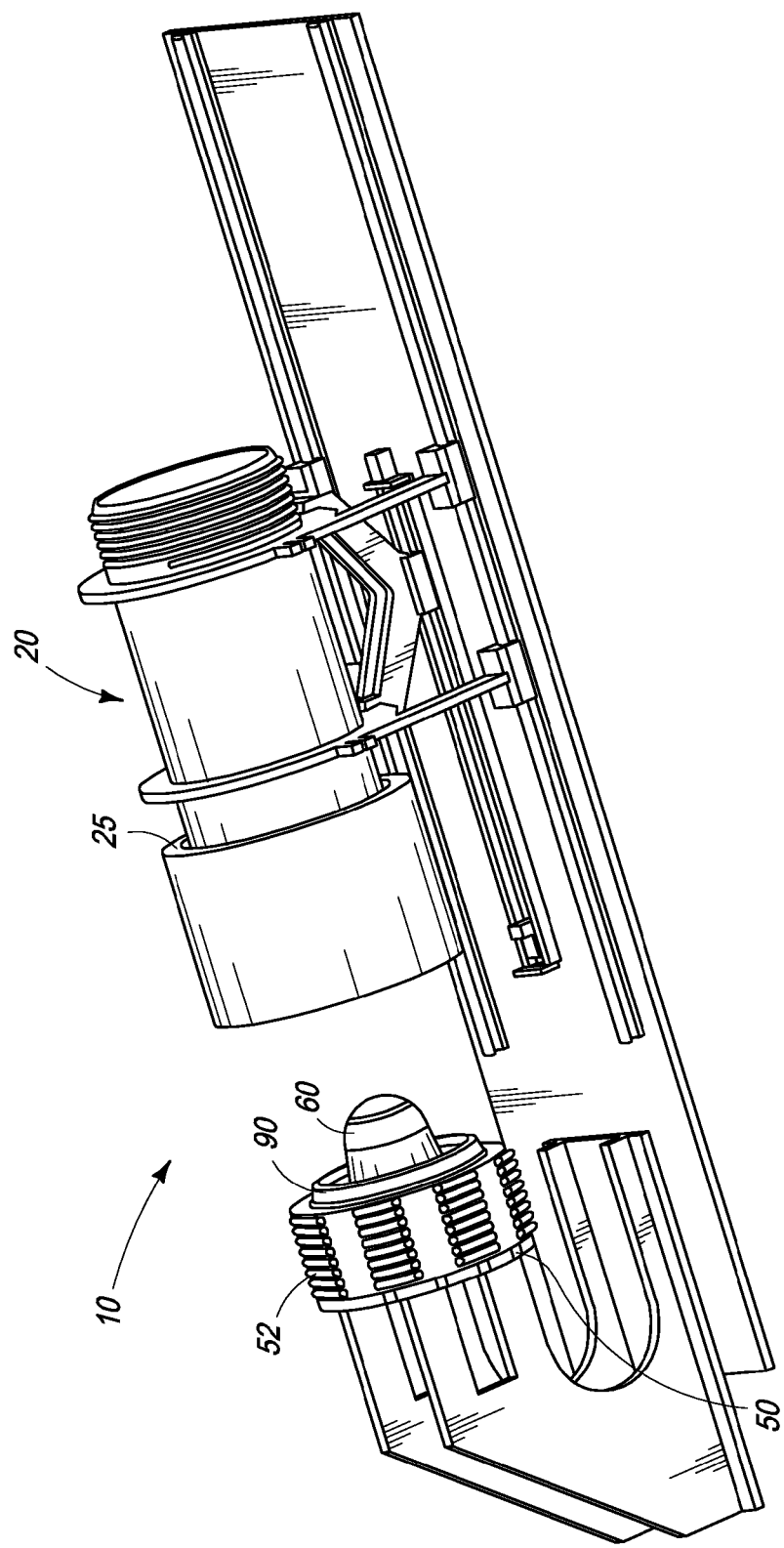
FIG. 3 is an alternate perspective view of an embodiment of the disclosed press.
Figure 4A:
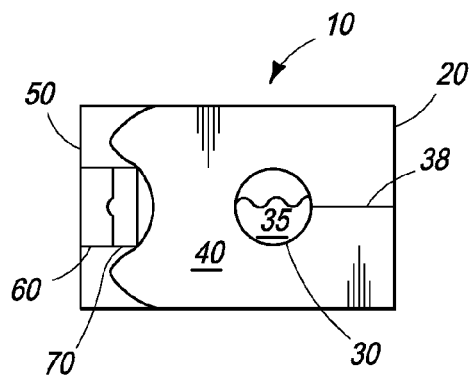
FIGS. 4*a*-4*d* are schematic illustrations of an aspect of the operation of an embodiment of the disclosed press.
Figure 4B:
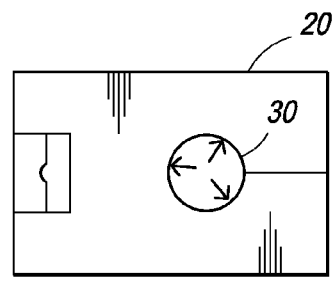
Figure 4C:
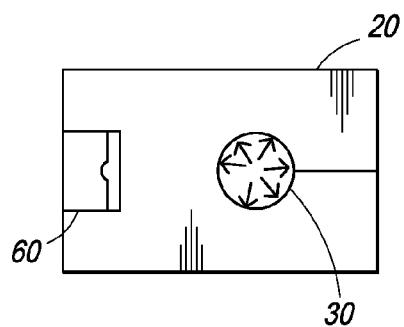
Figure 4D:
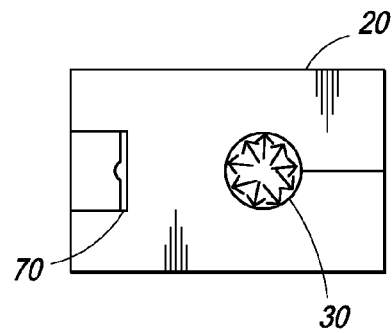

FIGS. 2 and 3 are alternate perspective views of an embodiment of the disclosed press showing particular features such as artillery breach threading 52. One configuration of pressure chamber 20 has a reinforced chamber wall 25 in the region where the threading will mate and lock. It is noted that the particulars of high pressure chamber design are believed to be well known in the art, where design specifications such as kind of steel, thickness and other dimensions and desirable qualities are selected to produce a pressure vessel capable of holding the designed internal pressure load, with appropriate margins of safety, all as known in the art. In addition it is noted that pressure deliverable to the work piece can be no greater than the pressure delivered to the chamber walls.

In FIG. 1, press generally shown at 10 has pressure chamber generally shown at 20 with chamber wall 25. Chamber 20 has sealing surface 23 machined as part of wall 25 for mating with (outer) sealing surface 93 of gasket or seal 90. Lid 50 is threadably and lockably engaged onto and into chamber 20 in the direction of arrow 21, and lid threads 52 mate with chamber threads 22. Disposed on an inner surface of lid 50 is platen 80 which is desirably adapted to be rapidly heated and cooled (see FIG. 5), and upon platen 80 is mounted mold 60 over which is work piece composite layup or pre-preg 70. Chamber 20 is nearly filled with pressure transfer medium 40 (generally solid silicon but optionally particulate silicone spheres or crumb-balls 41), in the middle of which is embedded elastomeric pressure vessel 30. See also discussion of particle making in U.S. Pat. No. 4,670,530 to Beck, which is hereby incorporated by reference as if fully set forth. When vessel 30 is first filled from conduit 38 and then pressurized (see FIG. 4), vessel 30 expands slightly to move the pressure transfer medium into pressing position by taking up all space not occupied by mold 60, work piece 70 and platen 80. Optional barrier 42 is disposed between transfer medium 40 and work piece 70. As pressure in vessel 30 increases with increasing pressure of fluid 35, the pressure is, in hydraulic-like fashion, transmitted outward equally in all directions to press against wall 25 and to compress work piece 70 against mold 60, gradually deforming and compressing piece 70 into the desired part.

Figure 5:
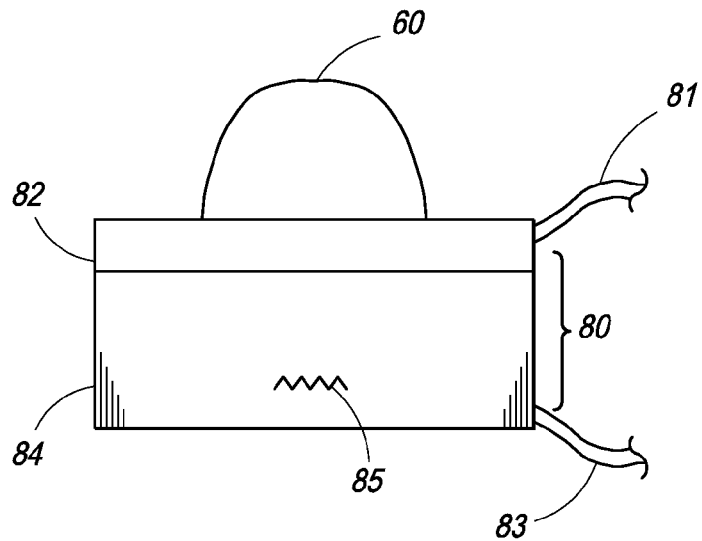
FIG. 5 is a schematic illustration of an embodiment of the rapid heating and cooling structures of the disclosed press.

FIG. 5 schematically illustrates the rapid heating and cooling structures of platen 80. Platen 80 has a cooling platen member 82 and a heating platen member 84, respectively fed their respective cooling and heating fluids through conduits 81 and 83. Heating member 84 optionally has electrical induction heating means 85, powered by power cable (not shown). Cooling is accomplished by rapid flushing of cooling fluids through internal conduits in member 82 (not shown) to cool the platen surface next to mold 60 and work piece 70 and thus to cool and set the work piece into the desired part for release and removal. When the piece is removed, and new work piece 70 is applied to the mold, then rapid heating takes place in member 84 (as needed, for desirably, member 84 stays hot throughout the press function) either by flushing with hot fluids through internal conduits (not shown) or by induction heating, or both, and by thermal transfer through heat conducting member 82 (at this point no longer cooling) to mold 60.

Figure 6:
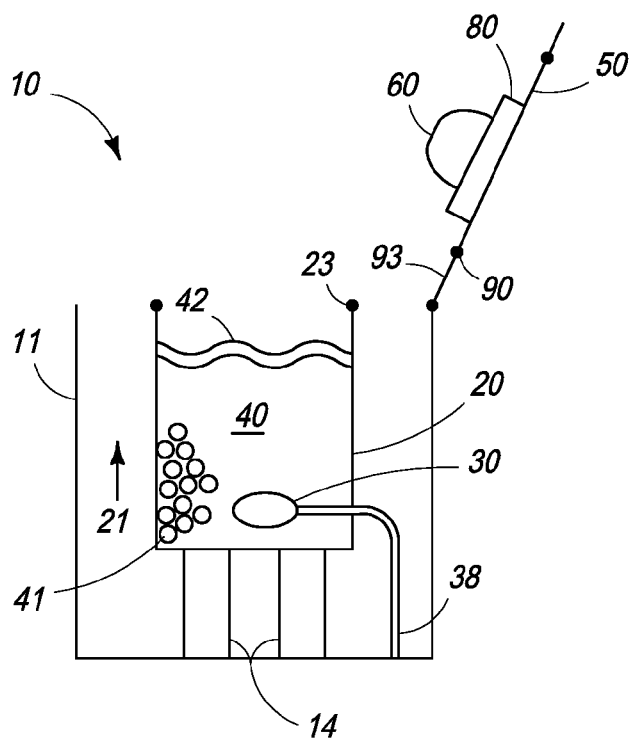
FIG. 6 is a schematic illustration of an alternate embodiment of the disclosed press.

FIG. 6 schematically illustrates an "active pressure" alternate embodiment of the disclosed press. Press 10 has press enclosure 11 inside of which are one or more hydraulic lifts 14. Press enclosure 11 has lid 50 which has gasket or seal 90 having sealing surface 93. Mold platen 80 and mold 60 are disposed on lid 50. Pressure chamber 20 with sealing surface 23 is inside press enclosure 11 and is raisable in direction 21 to seal surface 23 against lid sealing surface 93 when lid 50 is closed and locked (not shown). This kind of hydraulic lifting or raising and then ongoingly holding the two sealing surfaces together is referred to sometimes herein as "active pressure." Press 10, like the other embodiments illustrated herein also has pressure transfer medium 40, elastomeric pressure vessel 30, and optional barrier 42, with vessel 30 in fluid communication to a source of high pressure fluid (not shown) via conduit 38. An alternate, or addition, to medium 40 is particulate medium schematically shown at 41.

Figure 7:
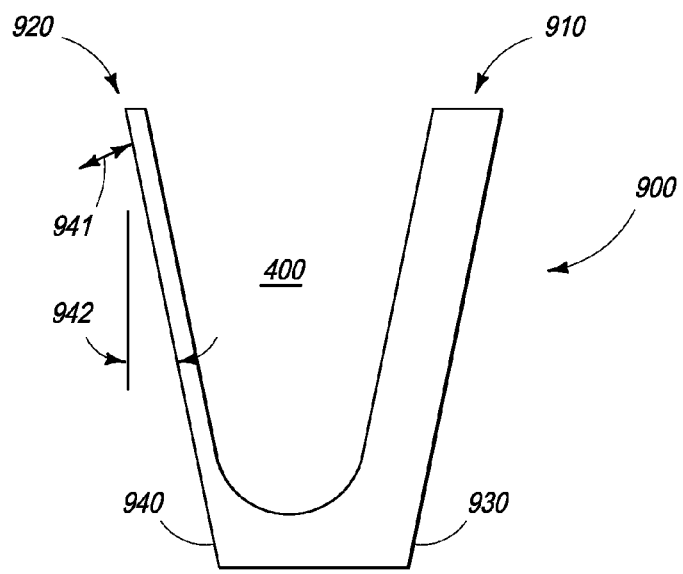
FIG. 7 is a schematic illustration of an alternate embodiment of a wedging gasket for the disclosed press.

In FIG. 7, wedging gasket shown generally at 900 has outer relatively rigid member 910 with surface 930 that is in mating press fit relationship to the vessel or lid (not shown) to be sealed, and another slightly angled inner slightly resilient member 920 with mating surface 940. Member 920 is desirably at angle 942, where angle 942 is the smallest working angle needed to effect the fit and release of the gasket with the venting properties disclosed herein. Appropriate working values for angle 942 have been found to be in the range of 6 to 45 degrees and more particularly 8 to 12 degrees. The space or void between gasket member 910 and angled member 920 is filled with silicone 400 or other substantially incompressible but elastomeric medium. In operation, as the lid is closed or the pressure chamber is otherwise closed, angled inner member 920 is preliminarily mated with its respective sealing surface. Then after initial compressing pressure is applied inside the chamber and trapped or entrained gases such as air are vented out through the gasket's not yet perfect seal, the transfer medium (not shown) is pressed against silicone 400 and it in turn slightly deforms angled member 920 in the direction indicated by arrow 941 into an increasingly perfect interference fit with the respective mating surface (not shown). When the pressure in the chamber is reduced, and the corresponding pressure in silicone 400 holding angled member 920 against its respective sealing or mating surface is released, angled member 920 springs back to its un-pressured configuration and dimension in the other return direction indicated by arrow 941.

Figure 8A:
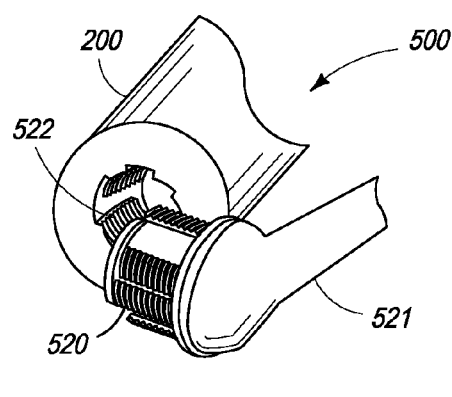
FIGS. 8*a* and 8*b* are schematic illustrations of conventional artillery breech mechanisms.
Figure 8B:
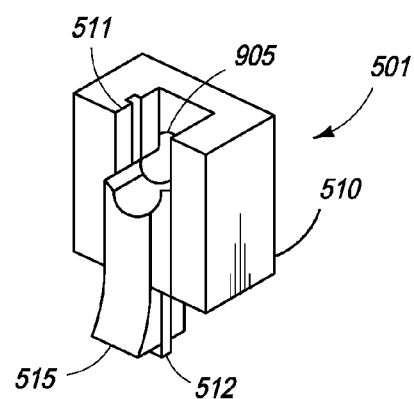

FIGS. 8a and 8b are schematic illustrations of conventional artillery breech mechanisms. Breech mechanism 500 has chamber 200 in which is female breech screw opening 522. Operating handle 521 moves male breech screw threading 520 into the opening and turn of handle 521 closes and locks the threads. Breech mechanism 501 has breech block 510 in which is an opening sealed with sealing member 905. Breech slide 515 slides along grooves 511 and rails 512 to close the opening against member 905.

A preferred transfer medium is a solid cast platinum cure silicone matrix or a silicone bead of varying size from 1 mm to 40 mm with a number of different sizes advantageously used at once. The silicone may advantageously be a metal powder admixture, especially where thermal conductivity of the medium is advantageous. Example metal powders may be copper or aluminum powder.

Tests show that very even distribution of pressure over the entire surface of the part is available with the disclosed press, enabling optimal performance of composite completion even in complex forms. Disclosed presses are designed to operate at extremely high pressures, ranging from 400 psi to 8500 psi and sometimes a high as 20,000 psi (2.8 to 59 MPa and sometimes as high as 138 MPa, respectively).

On the subject of cost, on the new press market a hydraulic press is a good deal at $0.21 per psi applied. A hydraulic press on the used market is on the low side $0.11 per psi applied. The disclosed press comes in at about $0.05 per psi applied, or one quarter the price of a new hydraulic press and half the price of a used press. With the disclosed press a finished part may be removed and a new part loaded in as little as 5 minutes, as in a 1 pound AD layer spectra shield or Dyneema HB series composite.

On the subject of safety, in the disclosed press there is no volume of built up pressure, meaning in the unlikely event of a chamber failure there is no explosion of gas just a rapid shredding of the transfer matrix and a elastomeric gel is extruded at low velocity. Since the pressure itself presents a minimal danger, the remaining risk is the various moving parts. The lid is advantageously mechanically locked in the up or open position so that in the event of a hydraulic line failure the lid is incapable of moving.

Disclosed presses are advantageously modular systems, with common and standard parts. For instance, all bolts are desirably common sized grade 8, and most fittings are of common size and availability. Presses are preferably constructed of x-rayed a36 alloy plate with 3130, 4140, 4340 and h13 alloy parts.

An example locking press pressure chamber has 4 sections of threaded structural tube and a mold plug. The inside diameter (ID) of the pressure chamber is 17.75 inches (45.08 cm) with an outside diameter (OD) of 20.0 inches (50.8 cm). A flange is threaded onto the pressure chamber and a collar fits over the flange and locks onto the mold plug using artillery breach screw threads. The mold plug is sealed to the pressure chamber with a metal ring seal.

In the pressure chamber, there is a threaded connection to the pressure chamber flange. This connection is loaded in tension. The threads are UN standard form with a pitch of 0.125 inch (0.318 cm). They have a mean diameter (Dm) of 19.75 inches (50.17 cm) and a thread length (L) of 6.0 inches (15.2 cm). The pressure chamber flange acts as a shear member that the collar flange is loaded against when tightening the pressure chamber onto the mold plug. The pressure chamber flange is tightened against a shoulder to locate it along the axis of the pressure chamber. The threads have the same stresses as the threads on the pressure chamber. The pressure chamber is loaded in shear by the collar flange with the full 10 million pounds across its length at the shear diameter of 20 inches. The shear area for this is 376 square inches. A locking collar flange has an inside diameter of 20 inches. The connection to the collar is threaded using UN standard thread form with 0.25 inch pitch and a mean thread diameter of 22.625 inches with a pitch of 0.250 inch. It is threaded into the collar and is the means by which the connection alignment is adjusted. It is 6 inch long and its shear area is 424 square inches.

Preferred artillery screw threads are a modified thread designed to handle loads in one direction only. The loaded thread face is 5 degrees from perpendicular to the axis. This decreases the chances of seizing due to decreased "wedging". The artillery thread form is also stronger because when loaded, the threads will not attempt to dilate the collar which would decrease the shear area of the threads. The pitch for these threads is 0.5 inch. The face that is not loaded is at a 30 degree angle from perpendicular to the axis. The 30 degree angle allows the root to be thicker and decreases the bending stress on the screw. The artillery threads are shaved off at every ⅛ of a rotation until just under 50% of the thread is remaining. This allows the threads to be completely engaged after ⅛ of a rotation; increasing production efficiency. To allow for engagement/disengagement while the seal is fully seated the threads are advantageously spaced about an extra 0.1 inch (about 0.25 cm) apart.

The locking collar is machined from structural steel tubing with a 26 inch OD and a 2 inch wall. The minimum area loaded in tension is at the relief for the threading operation of the preferred artillery threading. This diameter is 23.55 inches giving a tensile area of 95 square inches. This is believed to result in a tensile stress of 105 ksi. The threads attaching the locking collar flange have the same stresses as those on the locking collar flange.

The mold plug seals against the pressure chamber and has the attachment fittings for the aluminum mold. The mold plug is loaded axially against the artillery threads and experiences the same shear loads as the locking collar.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A press comprising a pressure chamber and lid, the chamber filled with a substantially incompressible medium, the medium at least partially enclosing an elastomeric pressure vessel, the vessel adapted to be filled with a substantially incompressible fluid that is in fluid communication with a pressurized source of the fluid.

2. The press of claim 1 wherein the incompressible medium is solid silicone, and the elastomeric vessel is rubber, and further wherein the silicone completely encloses the vessel.

3. The press of claim 1 further comprising a mold platen and a work piece disposed upon the lid and in pressure-mating relationship to the substantially incompressible medium.

4. The press of claim 1 further comprising a mold platen and a work piece disposed thereon and in pressure-mating relationship to the substantially incompressible medium.

5. The press of claim 1 wherein the substantially incompressible medium is particulate silicone.

6. The press of claim 5 further comprising a mold platen and a work piece disposed thereon and in pressure-mating relationship to the particulate silicone, and further comprising a barrier between the particulate silicone and the work piece.

7. A press comprising a pressure chamber filled with a substantially incompressible medium, the medium at least partially enclosing an elastomeric vessel, the elastomeric vessel filled with a substantially incompressible fluid that is in fluid communication with a pressurized source of the same fluid.

8. A press system for forming a composite article from a work piece at elevated temperatures and pressures, the system comprising
    a pressure chamber filled with a substantially incompressible medium, the medium
    at least partially enclosing an elastomeric vessel, the elastomeric vessel filled with oil and in fluid communication with a source of pressurized oil,
    the work piece disposed within the pressure chamber,
    the substantially incompressible medium disposed so that it is capable of transferring a substantially uniform predetermined pressure to the surface of the work piece in the following steps:
        (a) causing the vessel to produce a pressure in the range of 400 to 20000 psi (2.8 to 138 MPa) to be applied to the substantially incompressible medium;
        (b) exposing the mold and work piece to elevated temperatures to create the composite article;
        (c) reducing the mold and work piece temperature to set the composite article.

\* \* \* \* \*